United States Patent
Weng et al.

(10) Patent No.: US 7,089,997 B2
(45) Date of Patent: Aug. 15, 2006

(54) HEAT EXCHANGER USING WATER LIQUID AND VAPOR PHASES TRANSFORMATION TO ENHANCE HEAT EXCHANGE PERFORMANCE

(75) Inventors: Kuo-Liang Weng, Taichung Hsien (TW); Ming-Tsun Ke, Taipei (TW); Jing-Wen Weng, Taichung Hsien (TW)

(73) Assignee: Cohand Technology Co., Ltd., Taichung Hsien (TW)

( * ) Notice: Subject to any disclaimer, the term of this patent is extended or adjusted under 35 U.S.C. 154(b) by 398 days.

(21) Appl. No.: 10/742,804

(22) Filed: Dec. 23, 2003

(65) Prior Publication Data
US 2005/0133195 A1    Jun. 23, 2005

(51) Int. Cl.
*F24F 3/14* (2006.01)

(52) U.S. Cl. ............... 165/60; 62/90; 62/91; 62/92; 62/96

(58) Field of Classification Search ............ 165/60; 62/89, 90, 91, 92, 93, 95, 96, 98, 99
See application file for complete search history.

(56) References Cited

U.S. PATENT DOCUMENTS

| | | | | |
|---|---|---|---|---|
| 4,934,451 A | * | 6/1990 | Colvin .................. | 165/48.1 |
| 5,333,470 A | * | 8/1994 | Dinh ..................... | 62/90 |
| 5,689,962 A | * | 11/1997 | Rafalovich ............. | 62/90 |
| 5,727,623 A | * | 3/1998 | Yoshioka et al. ........ | 62/93 |
| 6,134,903 A | * | 10/2000 | Potnis et al. ........... | 62/94 |
| 6,158,242 A | * | 12/2000 | Lu ....................... | 62/93 |
| RE37,464 E | * | 12/2001 | Meckler ................ | 62/93 |
| 6,408,633 B1 | * | 6/2002 | Carr ..................... | 62/99 |
| 6,591,902 B1 | * | 7/2003 | Trent .................... | 62/90 |
| 6,796,140 B1 | * | 9/2004 | Weng et al. ............ | 165/60 |

* cited by examiner

Primary Examiner—Ljiljana Ciric
(74) Attorney, Agent, or Firm—Troxell Law Office, PLLC

(57) ABSTRACT

A heat exchanger that uses water liquid and vapor phases transformation to enhance heat exchange performance mainly includes a primary heat exchanger, a water vaporization device and an auxiliary heat exchanger. The auxiliary heat exchanger has an upper heat exchange tube on an upper end and a lower heat exchange tube on a lower end thereof. The upper and lower heat exchange tubes are connected by a plurality of vertical heat tubes. Refrigerant and water serve as heat exchange media to pre-cool (pre-heat) air intake. The auxiliary heat exchanger and water vaporization device can generate liquid and vapor phases transformation to increase water content in the air to enhance heat exchange effect of the air, thereby to enhance heat exchange performance of the heat exchanger, and save energy and reduce thermal pollution.

5 Claims, 4 Drawing Sheets

HEAT EXCHANGER USING WATER LIQUID AND VAPOR PHASES TRANSFORMATION TO ENHANCE HEAT EXCHANGE PERFORMANCE

BACKGROUND OF THE INVENTION

1. Field of the Invention

The present invention relates to a heat exchanger that uses water liquid and vapor phases transformation to enhance heat exchange performance thereby to save energy and reduce thermal pollution.

2. Description of the Prior Art

A conventional refrigeration air conditioning system 9 (as shown in FIG. 1) mainly includes a compressor 91, a condenser 92, an evaporator 93, a refrigerant flow controller 94 and a refrigerant switch valve 95. The condenser 92 and the evaporator 93 generally are called heat exchanger (or heat exchange device) A. It mainly includes a coiled tube L and an air fan motor M (referring to FIG. 2). Such a heat exchanger has drawbacks in operation, notably:

1. During heat discharge operation, heat exchange occurs between air intake and the coiled tube of the heat exchanger. Heated air is directly discharged into atmosphere. The heated air produces thermal pollution to the environment.
2. In the lower temperature seasons (such as winter) water content in the air is low during heat absorption operation. Only sensible heat is exchanged during heat exchange process. As a result, heat exchange performance and efficiency decrease significantly.

SUMMARY OF THE INVENTION

In view of the aforesaid disadvantages, the present invention aims to provide an improved heat exchanger that mainly includes a primary heat exchanger, a water vaporization device and an auxiliary heat exchanger. The auxiliary heat exchanger has an upper heat exchange tube on an upper end and a lower heat exchange tube on a lower end. A plurality of vertical heat tubes are provided to connect the upper and lower heat exchange tubes. Refrigerant and water are used as heat exchange media to pre-cool (during heat discharge operation) or pre-heat (during heat absorption operation) air intake. And the auxiliary heat exchanger may be coupled with the water vaporization device to generate water liquid and vapor phases transformation effect to increase water content in the air and enhance heat exchange capability of the air, thereby heat exchange performance of the primary heat exchanger may be enhanced, and energy may be saved and thermal pollution may be reduced.

The objects of the invention are as follow:

1. Provide a heat exchanger that uses water liquid and vapor phases transformation to enhance heat exchange performance. When the primary heat exchanger is functioned to discharge heat, the auxiliary heat exchanger generates pre-cooling effect. Coupled with the water vaporization device to increase moisture, water content in the air may increase to enhance heat exchange performance of the primary heat exchanger and transform sensible heat to latent heat thereby to save energy and reduce thermal pollution.
2. Provide a heat exchanger uses water liquid and vapor phases transformation to enhance heat exchange performance. When the heat exchanger is functioned to absorb heat, the auxiliary heat exchanger generates pre-heating effect for air intake. Coupled with the water vaporization device to increase moisture, water content in the air may increase thereby to enhance heat exchange performance of the primary heat exchanger and save energy.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
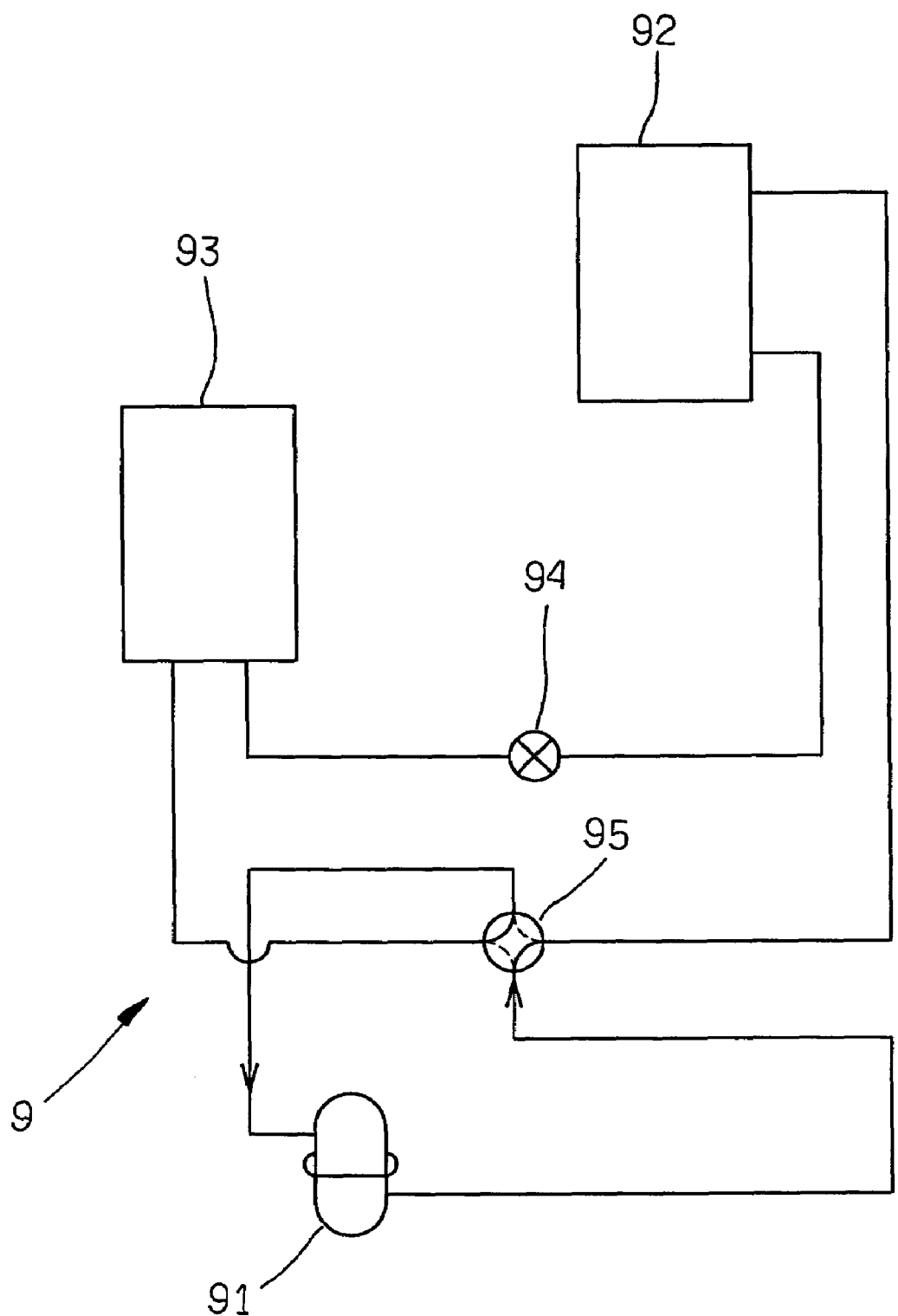
FIG. 1 is a schematic view of a conventional refrigeration air conditioning system.
Figure 2:
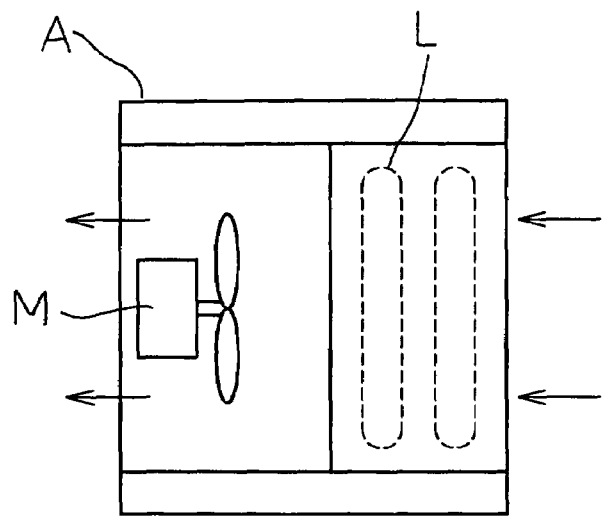
FIG. 2 is a sectional view of a heat exchanger of a conventional refrigeration air conditioning
Figure 3:
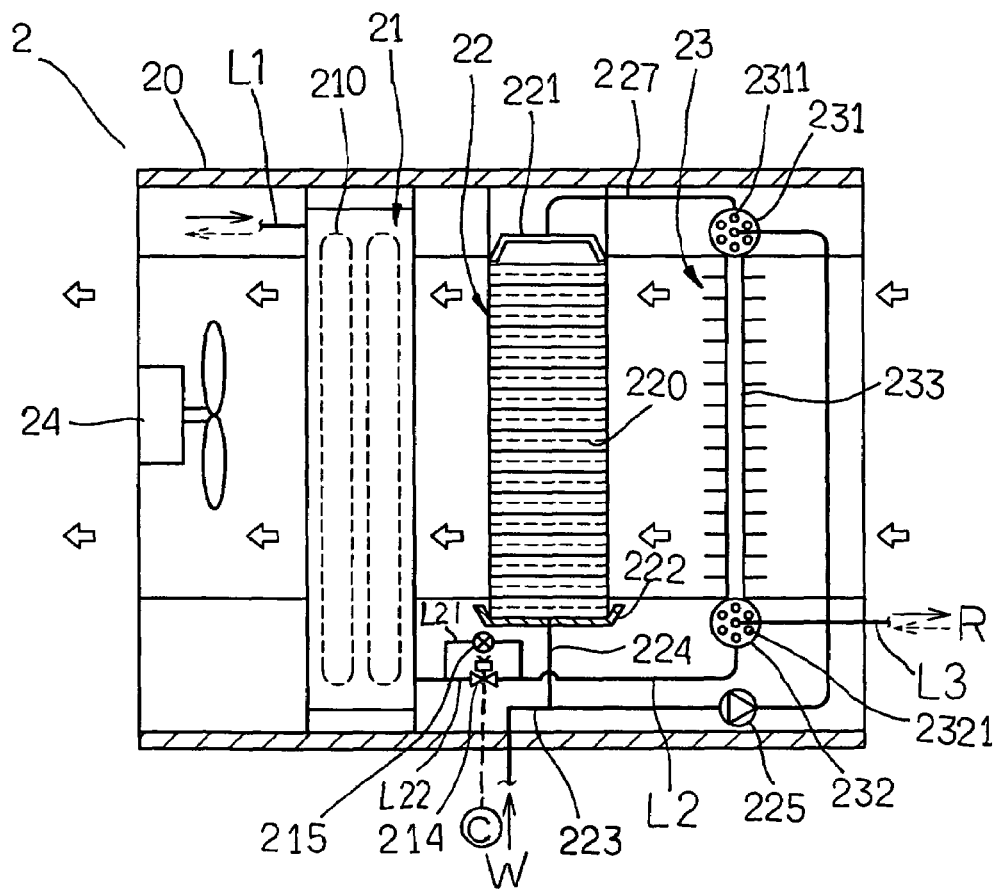
FIG. 3 is a sectional view of the heat exchanger according to the invention.
Figure 4:
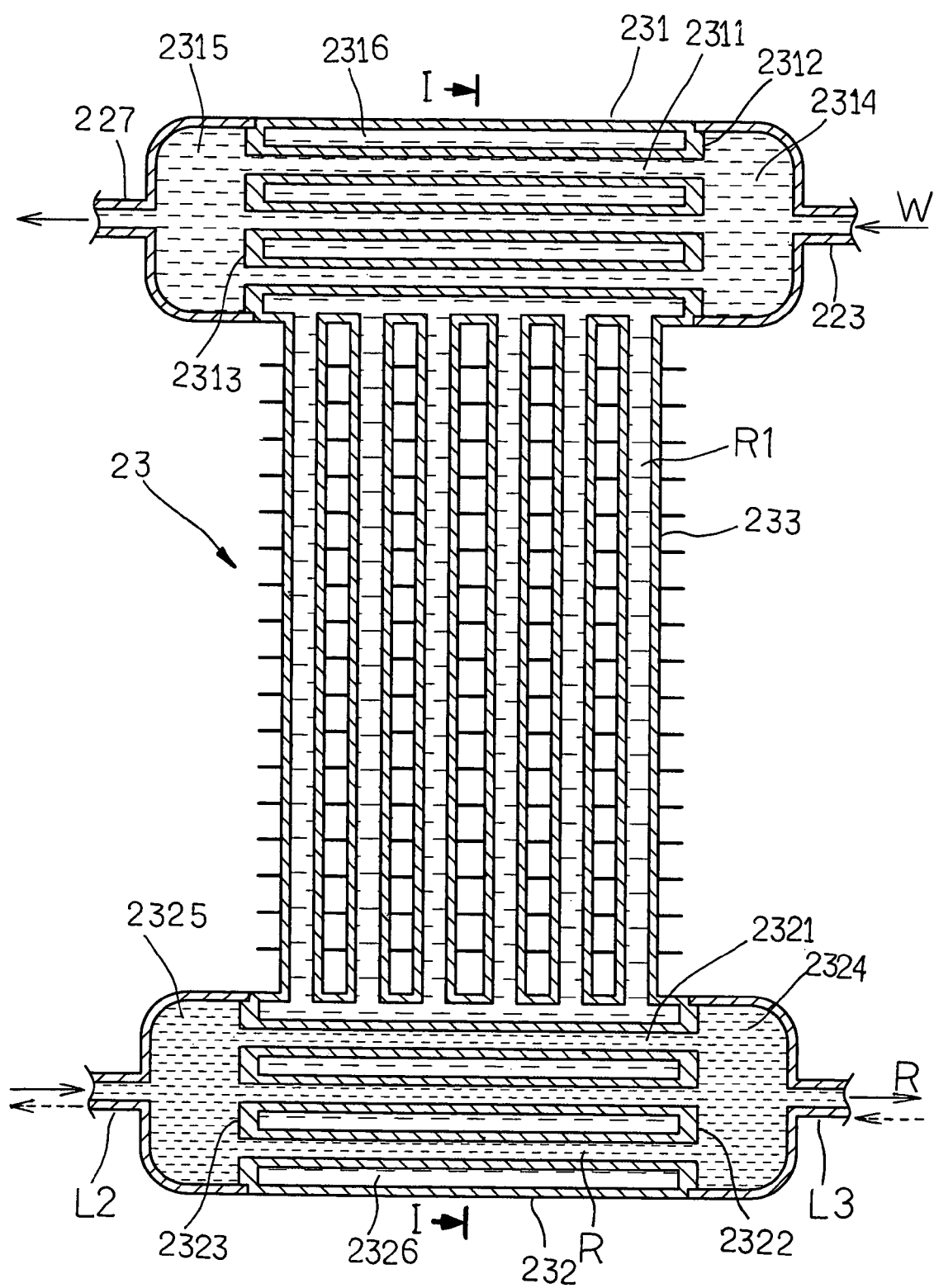
FIG. 4 is a sectional view of the auxiliary heat exchanger according to the invention.
Figure 5:
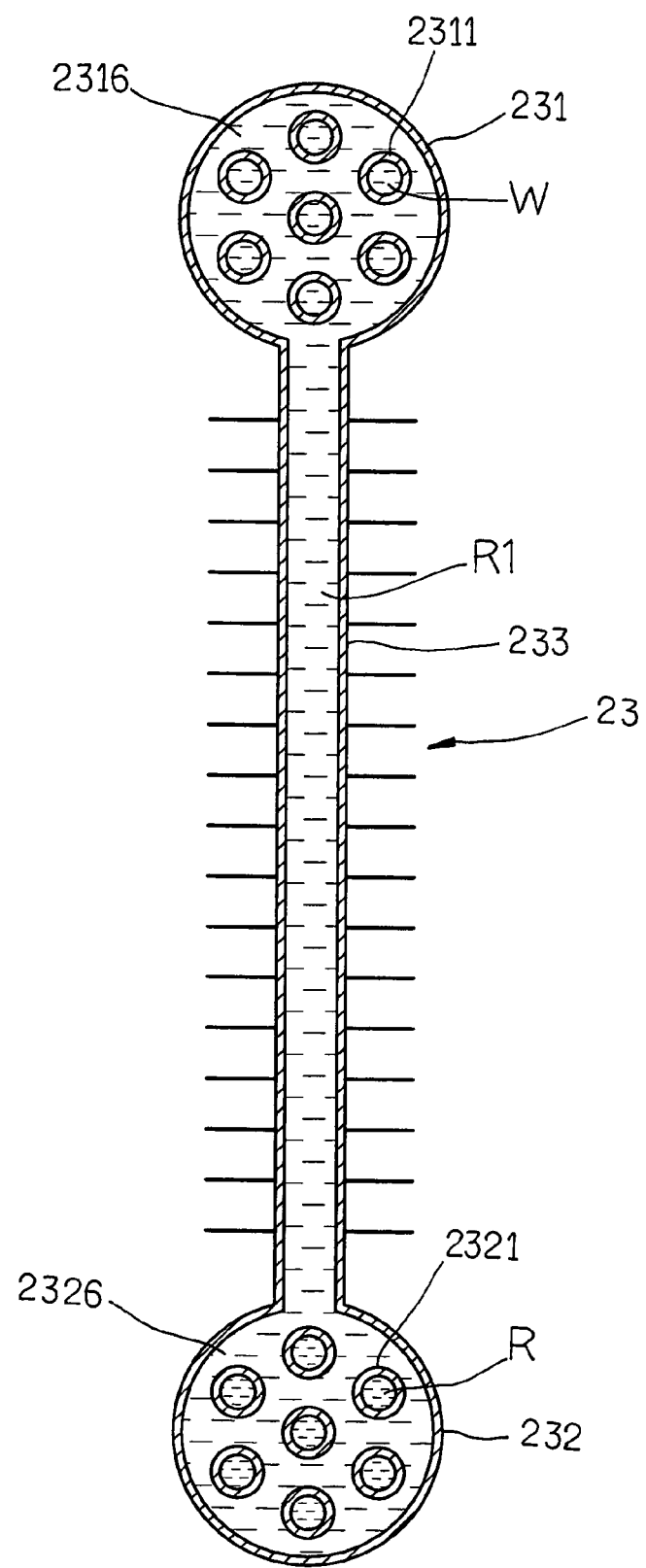
FIG. 5 is a cross section taken on line I—I in FIG. 4.

Referring to FIGS. 3, 4 and 5, the present invention mainly includes a heat exchanger 2 which has a case 20. In the case 20, there are a primary heat exchanger 21, a water vaporization device 22 and an auxiliary heat exchanger 23.

The primary heat exchanger 21 includes an air fan 24 with a heat exchange coiled tube 210 located therein. It has an upper end connecting to a first refrigerant delivery tube L1 to circulate system refrigerant R and a lower end connecting to a second refrigerant delivery tube L2, and is connected to a lower heat exchange tube 232 of the auxiliary heat exchanger 23. The second refrigerant delivery tube L2 has a first branch tube L21 and a second branch tube L22. The first branch tube L21 is coupled with a refrigerant flow controller 215. The second branch tube L22 is coupled with a first refrigerant solenoid check valve 214.

The water vaporization device 22 generates water vapor from water and air intake. It has a water discharge head 221 on an upper side to connect to a first water delivery tube 227, and also connects to the auxiliary heat exchanger 23 to allow water intake W to directly eject moisture through the water discharge head 221, or the water discharge head 221 is connected to a body 220 made from air and water permeable material to generate heat exchange and increase moisture between the passing air and water molecules. Moreover, there is a water collection tray 222 located at the bottom of the water vaporization device 22 that has a bottom connecting to a second water delivery tube 224 and a third water delivery tube 223. The third water delivery tube 223 is connected to an upper heat exchange tube 231 of the auxiliary heat exchanger 23. And the third water delivery tube 223 is coupled with a water pump 225.

The auxiliary heat exchanger 23 is located at a front side of the air intake side of the water vaporization device 22. It includes the upper heat exchange tube 231, the lower heat exchange tube 232, and a plurality of vertical heat tubes 233 connecting to and communicating with the upper heat exchange tube 231 and lower heat exchange tube 232. The upper heat exchange tube 231 contains a plurality of branch tubes 2311 in the middle portion in a transverse manner. The branch tubes 2311 have two ends communicating respectively with a first chamber 2314 and a second chamber 2315. Partitions 2312 and 2313 are provided to seal a surrounding area 2316 outside the branch tubes 2311 so that the surrounding area 2316 communicates with the heat tubes 233. They are filled with a first refrigerant medium R1. The first chamber 2314 communicates with the third water delivery tube 223. The second chamber 2315 communicates with the first water delivery tube 227. The lower heat exchange tube 232 contains a plurality of branch tubes 2321 in the middle portion in a transverse manner. The branch tubes 2321 have two ends communicating respectively with a third chamber 2324 and a fourth chamber 2325. Partitions 2322 and 2323 are provided to seal a surrounding area 2326 outside the branch tubes 2321 so that the surrounding area 2326 communicates with the heated tubes 233. They are filled with the first refrigerant medium R1. The third chamber 2324 is connected to a third refrigerant delivery tube L3, and the fourth chamber 2325 is connected to the second refrigerant delivery tube L2.

By means of the elements and construction set forth above, when the primary heat exchanger 21 operates mainly for heat discharging, system circulation refrigerant R flows from the first refrigerant delivery tube L1 into the heat exchange coiled tube 210 of the primary heat exchanger 21 (shown by the arrow directions in FIGS. 3 and 4), and flows out through a lower end of the second refrigerant delivery tube L2 and the second branch tube L22 into the lower heat exchange tube 232 of the auxiliary heat exchanger 23 (with the refrigerant solenoid check valve 214 on the second branch tube L22 controlled by a controller C and open), and flows continuously from the fourth chamber 2325 through branch tubes 2321 to the third chamber 2324. Meanwhile, the system circulation refrigerant R in the branch tubes 2321 and the first refrigerant medium R1 in the surrounding area 2326 generate heat exchange with each other due to temperature difference (evaporation effect), water intake w in the first chamber 2314 of the upper heat exchange tube 231 flows from the branch tubes 2311 to the second chamber 2315, and the water intake w of the branch tubes 2311 and the first refrigerant medium R1 in the surrounding area 2316 generate heat exchange with each other due to temperature difference (condensation effect). As a result, the first refrigerant medium R1 in the vertical heat tubes 233 generate circulation effect due to natural convection to enable air intake that passes through the heat tubes 233 to generate heat discharging or absorbing effect. Thus when heat exchange between the water intake w in the upper heat exchange tube 231 and the first refrigerant medium R1 is greater than the heat exchange between the system refrigerant R in the lower exchange tube 232 and the first refrigerant medium R1, and the temperature of the auxiliary heat exchanger 23 is lower than that of the air intake, air intake is pre-cooled in the auxiliary heat exchanger 23. When heat exchange between the water intake w in the upper heat exchange tube 231 and the first refrigerant medium R1 is smaller than the heat exchange between the system refrigerant R in the lower exchange tube 232 and the first refrigerant medium R1, and the temperature of the auxiliary heat exchanger 23 is higher than that of the air intake, air intake temperature is raised in the auxiliary heat exchanger 23 due to sensible heat effect, the air intake passing through the water vaporization device 22 may have increased moisture content, and water content in the air may increase. As a result, heat exchange performance of the primary heat exchanger 21 may be enhanced. It also helps to save energy and reduce thermal pollution to environments.

When the primary heat exchanger 21 operates mainly for heat absorption, the system circulation refrigerant R flows from the third refrigerant delivery tube L3 into the lower heat exchange tube 232 of the auxiliary heat exchanger 23 (shown by the broken arrow directions in FIGS. 3 and 4), and flows through the third chamber 2324 and branch tubes 2321 to the fourth chamber 2325, and from the second refrigerant delivery tube L2 and the first branch tube L21, and refrigerant flow controller 215 to the primary heat exchanger 21 (with the refrigerant solenoid check valve 214 controlled by the controller C and closed). The system circulation refrigerant R in the branch tubes 2321 and the first refrigerant medium R1 in the surrounding area 2326 generate heat exchange with each other due to temperature difference, and the system circulation refrigerant R discharges heat in the lower heat exchange tube 232, while the first refrigerant medium R1 absorbs heat and vaporizes. Meanwhile, water intake w in the first chamber 2314 of the upper heat exchange tube 231 flows from the branch tubes 2311 to the second chamber 2315, and the water intake w of the branch tubes 2311 and the first refrigerant medium R1 in the surrounding area 2316 generate heat exchange with each other due to temperature difference (condensation effect). As a result, water intake w in the upper heat exchange tube 231 absorbs heat and water temperature raises, and the first refrigerant medium R1 in the vertical heat tubes 233 generates natural convection circulation. As air intake is air of a lower temperature and a lower humidity, and the temperature of the first refrigerant medium R1 in the vertical heat tubes 233 of the auxiliary heat exchanger 23 is higher than that of the air intake, the air intake will be pre-heated under heat exchange effect. When the air intake passes through the water vaporization device 22, the vaporization effect of water and air intake boosts moisture and results in greater water content in the air intake. As a result, heat exchange performance of the primary heat exchanger 21 may be enhanced, and energy may be saved.

We claim:

1. A heat exchanger uses water liquid and vapor phases transformation to enhance heat exchange performance, comprising:

a primary heat exchanger including an air fan which has a heat exchange coiled tube located therein for circulating system refrigerant;

a water vaporization device for generating water vapor from water and air intake to allow passing air and water molecules to generate heat exchange function and add moisture; and an auxiliary heat exchanger located at a front side of an air intake side of the water vaporization device having an upper heat exchange tube on an upper end and a lower heat exchange tube on a lower end thereof, the upper heat exchange tube and the lower heat exchange tube being connected and communicated by a plurality of heat tubes, the upper heat exchange tube containing a plurality of branch tubes in a transverse manner in a middle section thereof, the branch tubes having two ends communicating respectively with a first chamber and a second chamber, and being sealed by partitions to form a surrounding area outside the branch tubes, the surrounding area communicating with the heat tubes and being filled with a first refrigerant medium, the first chamber communicating with a third water delivery tube, the second chamber communicating with a first water delivery tube, the lower heat exchange tube containing a plurality of branch tubes in a transverse manner in a middle section thereof, the branch tubes having two ends communicating respectively with a third chamber and a fourth chamber, and being sealed by partitions to form a surrounding area outside the branch tubes, the surrounding area communicating with the heat tubes and being filled with the first refrigerant medium, the third chamber communicating with a third refrigerant delivery tube, the fourth chamber communicating with a second refrigerant delivery tube.

2. The heat exchanger of claim 1, wherein the water vaporization device has a water discharge head connecting to a body which is made from an air and water permeable material.

3. The heat exchanger of claim 1, wherein the primary heat exchanger has an upper end connecting to a first refrigerant delivery tube.

4. The heat exchanger of claim 1, where the primary heat exchanger has a lower end connecting to the second refrigerant delivery tube which is connected to the auxiliary heat exchanger.

5. The heat exchanger of claim 1, wherein the water vaporization device has a water discharge head on an upper side connecting to the first water delivery tube.

* * * * *